United States Patent
Galitsky

(10) Patent No.: US 11,810,577 B2
(45) Date of Patent: Nov. 7, 2023

(54) DIALOGUE MANAGEMENT USING LATTICE WALKING

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 175 days.

(21) Appl. No.: 16/836,752

(22) Filed: Mar. 31, 2020

(65) Prior Publication Data

US 2020/0335109 A1    Oct. 22, 2020

Related U.S. Application Data

(60) Provisional application No. 62/834,870, filed on Apr. 16, 2019.

(51) Int. Cl.
G10L 17/22       (2013.01)
H04L 51/02       (2022.01)

(52) U.S. Cl.
CPC .............. *G10L 17/22* (2013.01); *H04L 51/02* (2013.01)

(58) Field of Classification Search
CPC ................................ G10L 17/22; H04L 51/02
See application file for complete search history.

(56) References Cited

U.S. PATENT DOCUMENTS

| | | | | |
|---|---|---|---|---|
| 7,454,469 | B2* | 11/2008 | Zhou | H04L 51/04 709/217 |
| 10,031,968 | B2* | 7/2018 | Venkataraman | G06F 16/907 |
| 2012/0296635 | A1* | 11/2012 | Brockett | G06F 40/166 704/9 |
| 2015/0142704 | A1* | 5/2015 | London | G06F 16/90332 706/11 |
| 2020/0143259 | A1* | 5/2020 | Lindsley | G06F 16/84 |
| 2020/0242199 | A1* | 7/2020 | Ploennigs | G06N 20/00 |

OTHER PUBLICATIONS

Bastian M., Heymann S., Jacomy M. (2009). Gephi: an open source software for exploring and manipulating networks. International AAAI Conference on Weblogs and Social Media, 2pp. (Year: 2009).*

(Continued)

*Primary Examiner* — Michelle M Koeth
(74) *Attorney, Agent, or Firm* — Kilpatrick Townsend & Stockton LLP

(57) ABSTRACT

Systems, devices, and methods provide improved autonomous agents by creating a concept lattice that represent objects and attributes and using the concept lattice to manage a dialogue with a user device. An autonomous agent application can receive queries from a user and serve response (e.g., responses identifying objects and/or object attributes) based on one or more traversals of a concept lattice. In some embodiments, the concept lattice can be generated from tabular data indicating a set of objects and respective sets of attributes. The user can provide further input to traverse from one selected node to another within the concept lattice in order to identify other nodes in the concept lattice that meet the user's needs.

22 Claims, 10 Drawing Sheets

(56) References Cited

OTHER PUBLICATIONS

Grandjean, Martin (2015). "GEPHI—Introduction to Network Analysis and Visualization", https://www.martingrandjean.ch/gephi-introduction, 46 pp. (Year: 2015).*

Tweedie, "This is the only chart you need to pick out your next smartphone," BusinessInsider.com, Feb. 8, 2015 (accessible at: https://www.businessinsider.com/smartphone-comparison-chart-2015-2, last accessed Apr. 3, 2023) , 4pp. (Year: 2015).*

Butka et al., "Use of Concept Lattices for Data Tables with Different Types of Attributes," Journal of Information and Organizational Sciences (JIOS), vol. 36, No. 1 (2012) (Year: 2012).*

Codocedo et al., A Proposition for Combining Pattern Structures and Relational Concept Analysis, Formal Concept Analysis—12th International Conference, ICFCA 2014, ClujNapoca, Romania, Jun. 10-13, 2014. Proceedings, Jun. 2014, Cluj-Napoca, Romania. pp. 96-111.

Galitsky et al., "Chatbot with a Discourse Structure-Driven Dialogue Management", Proceeding of the EACL 2017 Software Demonstrations, Valencia, Spain, Apr. 3-7, 2017, pp. 87-90.

Ganter et al., "Pattern Structures and their Projections" All-Russia Institute for Scientific and Technical Information, 16 pages.

Koiti, "SemAF—Discourse Structures", http://slideplayer.com/slide/6408486/. Last downloaded Feb. 28, 2018.

Kaytoue et al., "Pattern Structures and Concept Lattices for Data Mining and Knowledge Processing", Springer International Publishing Switzerland 2015, A. Bifet et al. (Eds.): ECML PKDD 2015, Part III, LNAI 9286, pp. 227-231, 2015.

Wang et al., "An Information Retrieval Approach Based on Discourse Type", C. Kop et al. (Eds.): NLDB 2006, LNCS 3999, pp. 197-202, 2006. © Springer, 2006.

Zhao et al., "Facilitating Discourse Analysis with Interactive Visualization", IEEE Transactions On Visualization and Computer Graphics, vol. 18, No. 12, Dec. 2012, pp. 2639-2648.

* cited by examiner

| | Avg. Customer Review | | | | View screen - Display Size | | | | | | Price | | | | Viewfinder Type | | Video Capture Resolution | | | | ... |
|---|---|---|---|---|---|---|---|---|---|---|---|---|---|---|---|---|---|---|---|---|---|
| | 5 | 4 | 3 | 2 | 2-3 | 3-4 | 4-5 | 5-6 | 6-7 | 7-8 | 25 | 50 | 100 | 200 | LCD | Optical | UHD | FHD | HD | SD | ... |
| Camera A | | 1 | | | | | | 1 | | | | 1 | | | | 1 | | | 1 | | ... |
| Camera B | | | 1 | | | | 1 | | | | | | 1 | | 1 | | | 1 | | | ... |
| Camera C | | | | 1 | | | | | 1 | | | | | 1 | 1 | | 1 | | | | ... |
| Camera D | | 1 | | | | | | 1 | | | | | | 1 | 1 | | | | | 1 | ... |
| Camera E | | | | 1 | | | | 1 | | | | | 1 | | | 1 | 1 | | | | ... |
| Camera F | 1 | | | | | 1 | | | | | | | | 1 | | 1 | | 1 | | | ... |
| Camera G | | | 1 | | | 1 | | | | | | 1 | 1 | | 1 | | 1 | | | | ... |
| Camera H | | | | 1 | | | 1 | | | | | 1 | 1 | | | 1 | | | 1 | | ... |
| Camera I | | | | | | | | 1 | 1 | | | | | | 1 | 1 | | | | 1 | ... |
| Camera J | 1 | | | | | | | | | | | 1 | | | 1 | | | | | | ... |
| Camera K | | | 1 | | | | | | | | 1 | | | | 1 | | | 1 | | | ... |

```
1  k, P_q ← extractInformation(q)
2  L(G*) ← find G* ∈ O s.th. k ∈ K(G*)
3  (A, B) = argmax_{(A,B)∈L(G*)}{|A| | P_q ⊆ B}
4  run ← True
5  GS_ranked ← {(A, B)}
6  while run and GS_ranked ≠ ∅ do
7      (A_r, B_r) ← pop(GS_ranked)
8      relevant ← A_r
9      M* = {M_i | M_i ∈ M, b ∈ M_i, b ∈ B, (A, B) ∈ LN((A_r, B_r))}
10     M*_spec = ask(M*)              ▷ ask the user for categories he wants to
           specify
11     if M*_spec = ∅ then
12         run ← False
13     end
14     else
15         S ← {b | b ∈ B, b ∈ M_i, M_i ∈ M*_spec}    ▷ suggest particular
             values within chosen categories
16         M_spec ← userChoice(S)
17         if M_spec ≠ ∅ then
18             GC ← findMostGeneralConcepts({(A, B) | M_spec ∪ P_q ⊆
                 B, (A, B) ∈ L(G*)})
19             GS_ranked ← sortByDeltaMeasure(GS)
20         end
21     end
22 end
23 return relevant
```

*FIG. 7*

DIALOGUE MANAGEMENT USING LATTICE WALKING

CROSS-REFERENCE TO RELATED APPLICATIONS

This non-provisional application claims priority to U.S. Patent Application No. 62/834,870, filed on Apr. 16, 2019, the disclosure of which is herein incorporated by reference in its entirety for all purposes.

TECHNICAL FIELD

This disclosure is generally concerned with computer-implemented management of dialog using linguistics. More specifically, this disclosure relates to using communicative discourse trees to perform discourse analysis.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

There is a need in the art for better dialog management of computer chatbots.

BRIEF DESCRIPTION OF THE DRAWINGS

FIG. 2 depicts a table of object attributes from which the concept lattice may be generated, in accordance with at least one embodiment.

FIG. 7 depicts an algorithm for a lattice walk, in accordance with at least one embodiment.

DETAILED DESCRIPTION

Figure 1:
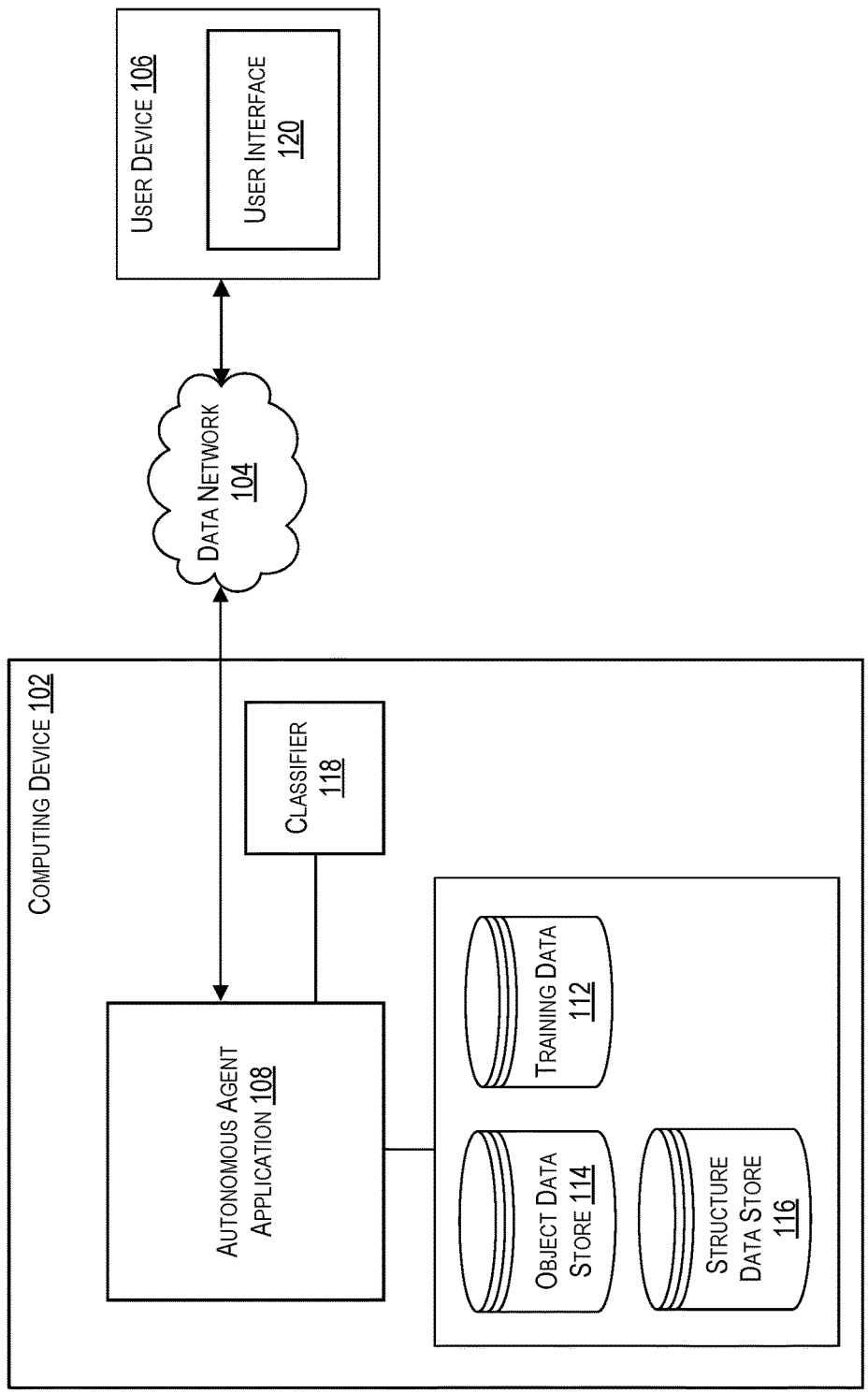
FIG. 1 depicts autonomous agent environment, in accordance with at least one embodiment.

Aspects disclosed herein provide technical improvements to the area of computer-implemented linguistics. More specifically, certain aspects use concept lattices to facilitate autonomous agents ("chatbots") that can implement dialogue management. Concept lattices can represent objects of interest (e.g., a camera, a laptop, a vehicle, a vacation package, a service, a daycare provider, a project, and the like) and attributes of those objects as nodes in a graph such as connecting edges represent the different possible combinations of attributes which can be associated with an object of interest. An "object of interest" (also referred to as an "object") is intended to refer to any suitable tangible or intangible goods and/or services. Dialogue management can refer to a process of receiving inputs from a user device and making decisions based on those inputs in a manner that is consistent with user expectations. Accordingly, by using the concept lattices discussed herein, autonomous agents (also referred to as "autonomous agent applications") can guide a dialogue between an autonomous agent and a user device through a discussion of attributes and objects of interest to a user.

Presentation of knowledge in dialogue format is a popular way to communicate information effectively. It has been demonstrated in games, news, commercials, and educational entertainment. Usability studies have shown that for information acquirers, dialogues often communicate information more effectively than monologue most of times.

In particular, disclosed systems provide improved autonomous agents as compared to existing solutions. For example, by generating and using concept lattices, disclosed solutions implement topic-independent systems that can automatically build a dialogue structure and associated scenarios from a concept lattice. In contrast, existing solutions often require specifically-designed topic-specific systems.

For example, disclosed systems implement autonomous agents that can deliver content in the form of a virtual dialogue. A virtual dialogue is defined as a multi-turn adversarial argumentation dialogue between imaginary agents obtained as a result of content transformation. Virtual dialogue is designed with the goal of effective information representation and is intended to look as close as possible to a genuine dialogue about a controversial topic. Using virtual dialogues as search results can be more effective means of information access and adjustment of user opinion in comparison to simply viewing original documents, as provided by a conventional agent or a search engine.

In another example, disclosed systems implement autonomous agents that can deliver a virtual persuasive dialogue, which includes presenting different viewpoints to a user device. The virtual persuasive dialogue can be automatically produced from analyzing sources such as documents. By presenting different viewpoints to a user, certain aspects provide a richer discourse than possible with traditional autonomous agents.

In yet another example, disclosed systems implement autonomous agents that use concept lattices in conjunction with rhetorical analysis to facilitate dialog management. Unstructured textual data can be used. A discourse tree refers to a structure that represents the rhetorical relations for a sentence or part of a sentence. Rhetorical relations refer to how two segments of discourse are logically connected to one another. Examples of rhetorical relations include elaboration, contrast, and attribution. The theoretical underpinnings of discourse, Rhetoric Structure Theory (RST), can be attributed to Mann, William and Thompson, Sandra, "Rhetorical Structure theory: A Theory of Text Organization," Text-Interdisciplinary Journal for the Study of Discourse, 8(3):243-281, 1988.

Turning now to the Figures, FIG. 1 depicts autonomous agent environment 100, in accordance with at least one embodiment. FIG. 1 depicts computing device 102, data network 104, and user device 106. Computing device 102 includes one or more of autonomous agent application 108, training data 112, object data store 114, structure data store 116, and classifier 118.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

In an example, autonomous agent application 108 receives one or more questions from user device 106. Autonomous agent application 108 analyzes the question, generates and/or accesses one or more concept lattices from the structure data store 116, formulates a response, and provides the response to the user device 106. In some embodiments, the autonomous agent application 108 can generate one or more concept lattices from stored data. For example, in some embodiments, the autonomous agent application 108 generates a concept lattice from tabular data stored in the object data store 114. The tabular data describes objects of a particular category and sets of attributes corresponding to those objects. Structure data store 116 stores one or more concept lattices. In some embodiments, each concept lattice can relate to a particular object category (e.g., camera, television, vehicle, etc.).

In some aspects, machine learning is used by the autonomous agent application 108 to generate dialog based on a received query. For example, computing device 102 can include classifier 118. Classifier 118 can be trained using training data 112. Examples of classifier 118 include predictive models, classification models, neural networks, and so on.

The following non-limiting example is introduced for discussion purposes. The autonomous agent application 108 accesses a set of attributes, or metadata, and a list of one or more objects with which the attributes apply. In some embodiments, the list of one or more objects and corresponding sets of attributes may be in tabular form and retrieved from the object data store 114. Not all attributes need apply to each object and not all objects necessarily have the same set of attributes. From the attributes and objects, the application creates a concept lattice that represents the attributes, objects, and relationships between the attributes and objects.

Byway of example, a table of digital cameras can be retrieved from the object data store 114. FIG. 2 depicts a table of object attributes (e.g., table 200) from which a concept lattice may be generated, in accordance with at least one embodiment. The table 200 depicts various attributes associated with a number of objects (e.g., cameras A-K). A greater or fewer number of attributes may be included in the table 200. By way of example, the cameras of FIG. 2 may also include various combinations of attributes such as aperture, shutter speed, pixel density, and the like. As a non-limiting example, a particular camera may have a 12 megapixel (MP) sensor, whereas another camera may have a 10 MP sensor but improved optical zoom, and so on. A lattice structure may be generated having a top end and a bottom end. The top end includes multiple nodes representing attributes with edges that propagate through intermediate nodes (representing combinations of attributes (e.g., 12 MP and <$300)). As the lattice is navigated downward, the edges connect to nodes that represent objects (e.g., a particular digital camera model). Example lattice structures are discussed below with respect to FIGS. 3 and 4.

Returning to FIG. 1, the autonomous agent application 108 uses a concept lattice retrieved from and/or accessed through the structure data store 116 to facilitate or manage dialog. Dialog can be initiated from different points. For example, via user interface 120, user device 106 may present a request to autonomous agent application 108 to provide a list of cameras that have a particular attribute set (e.g., 12 MP, less than $200, etc.). The autonomous agent application 108 accesses a concept lattice (e.g., a concept lattice associated with a digital camera category) and starting at the top, navigates through the lattice to refine the available attributes, culminating in objects (products) that meet the requirements.

In some embodiments, user device 106 can present a question to autonomous agent application 108 to request the best matching camera that is identical to a particular camera model but with specific variations, for example, slightly different attributes. Starting at the bottom, the autonomous agent application 108 accesses the object representing the particular object and navigates within the lattice structure according to the user's desired variations in attributes, asking the user additional questions along the way. Hence, the agent uses the lattice structure to guide the dialogue with the user.

The above-described interaction scenarios do not take into account mental states of the user but instead navigate through the information states of product attributes. Hence the underlying algorithm is tailored to represent objects and their attributes. By visualizing the objects, a user is aware of where he is driven to by the system and what are his current options. Additionally, autonomous agent application 108 can discover a combination of attributes that is interesting, but missing from existing products. These insights can help direct product design, for example.

Figure 3:
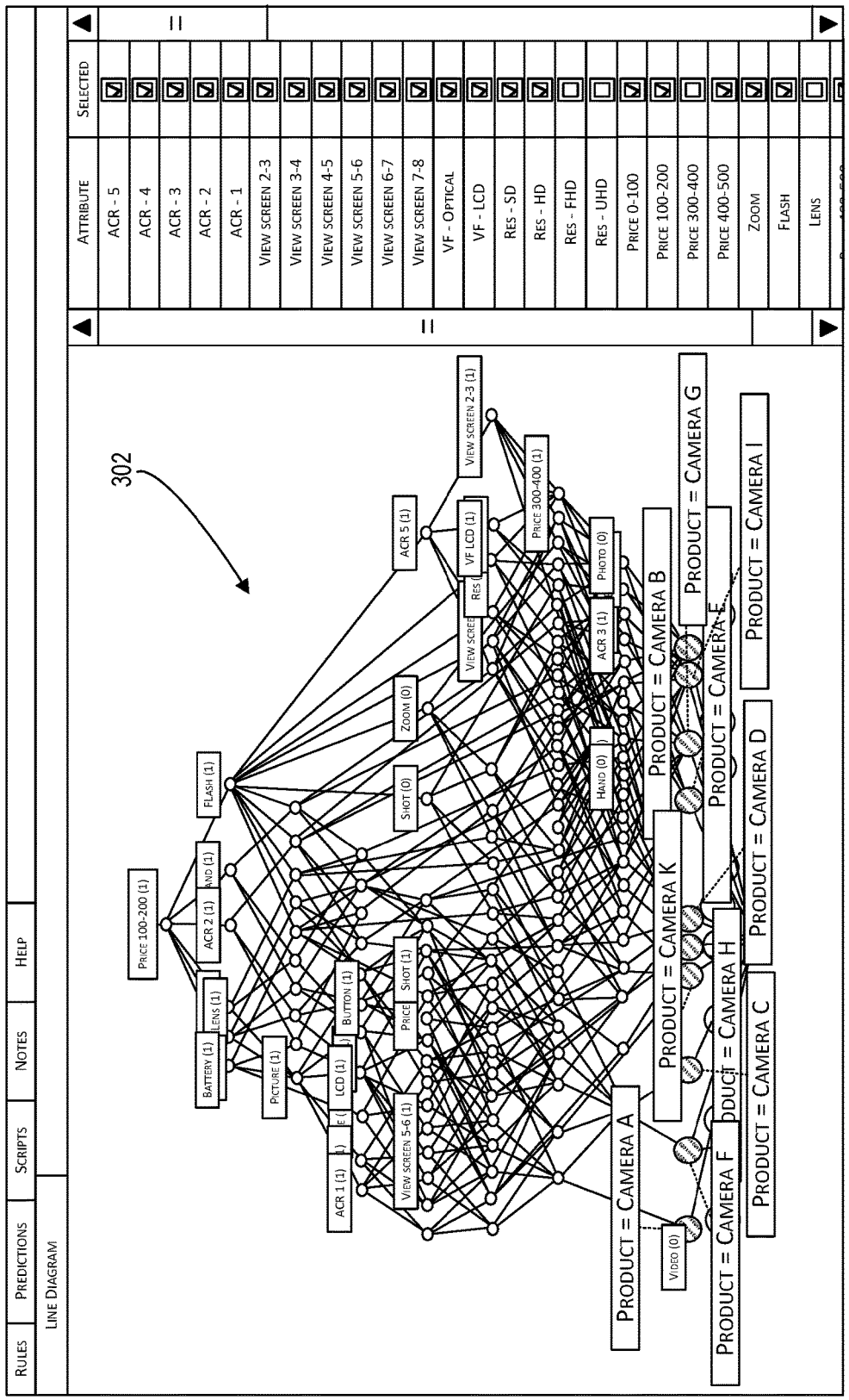
FIG. 3 depicts a user interface for interacting with a concept lattice, in accordance with at least one embodiment.

FIG. 3 depicts a user interface 300 for interacting with a concept lattice 302, in accordance with at least one embodiment. More specifically, example user interface 300 illustrates an interactive object platform for interacting with a concept lattice. The concept lattice can enable browsing for attributes for a series of comparable products.

In some cases, the interactive object platform can be used to visualize product attributes. The purpose of this view is to create visual impressions for the user of which attributes are advantageous or disadvantageous for a series of products of the same category (e.g., digital cameras). In some embodiments, the concept lattice is drawn automatically, and the user may re-locate nodes of interest or add/remove labels when interests and focuses change. For every product and its disadvantageous attributes, the lattice allows the identification of products where these attributes are better. The user can continue exploration of these recommended products and attempt to further express his needs to the system. A user can select products by selecting check boxes 304 for available products in order to obtain more comparative information. Similarly, users can remove products from the current view for a more comprehensive visualization of remaining products. The autonomous agent application 108 updates the lattice accordingly. For example, when a given object is selected, one can see all nodes (highlighted) of the lattice that contain attributes of this product, and, conversely, for every positive or negative attribute, a user can see all products having these attributes.

Figure 4:
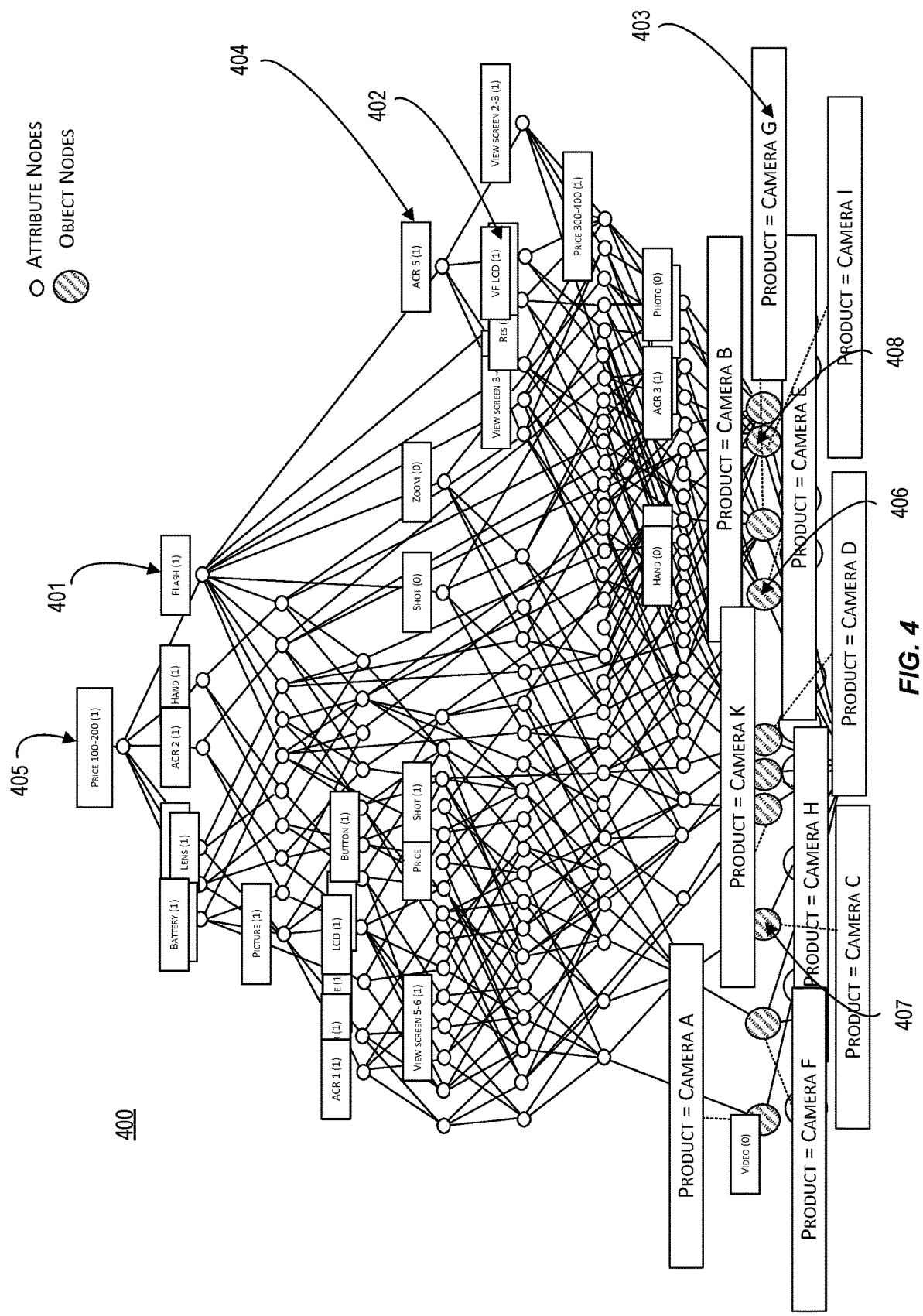
FIG. 4 depicts an example concept lattice, in accordance with at least one embodiment.

FIG. 4 depicts an example concept lattice 400, in accordance with at least one embodiment. Concept lattice 400 is a visualization of a recommendation platform for digital cameras.

For example, concept lattice 400 visualizes the generalization of products' attributes. Using the user interface 300 of FIG. 3 with the concept lattice 400, the user can move upwards for a higher-level view of product attributes, considering a larger number of products. Conversely, moving down, the scope of products is reduced and, driven by user device 106, the autonomous agent can drill into for more specific product analysis. Navigating all the way down, the autonomous agent arrives at individual products. Chatbot implementation does not necessarily need this visualization. In some embodiments, the user device is offered options to navigate the concept lattice up or down and the chatbot enumerates the corresponding sets of products and attributes.

In some embodiments, more than one concept lattice may be generated and/or maintained (e.g., in the structure data store 116 of FIG. 1). Each concept lattice may be associated with a particular category of a plurality of categories (e.g., electronics, digital cameras, vehicles, etc.). In an example dataset, G denotes a group of objects (e.g., digital cameras) for which the user is searching. The group of objects may individually be associated with a common category (e.g., digital cameras).

Formally, a thesaurus includes $O=\{G^*|G^*\in P(G)\}$, where $P(G)$ is a power-set of G. The groups might include other groups, be intersecting, disjoint, etc. For each group $G^*\in O$ a set of keywords $K(G^*)$ is defined. This set of keywords may include short descriptions of objects. It should be noted that each group $G^*$ has a unique collection of keywords, i.e., for $G^*_i \neq G^*_j$ and corresponding keyword sets $K(G^*_i)$ and $K(G^*_j)$ inequality $K(G^*_i) \cap K(G^*_j)=\emptyset$ always holds. The uniqueness of keywords (or key phrases) ensures that for any keyword (key phrase) there exists only one category of objects in the thesaurus O. As a simple example, "LCD camera with 4 stars reviews with 4 inch viewfinder" ⊂ "LCD camera with 4 stars reviews" ⊂ "LCD camera" ⊂ "LCD camera".

The objects may have any suitable number of attributes. We suppose that the set of all attributes $\mathcal{A}$ is divided into categories $A_i$, i.e., all attributes are grouped into categories and an attribute $a \in A_i$ is a particular value of the property/characteristic $A_i$. Let us consider digital cameras and their two characteristics "Video Capture Resolution" and "Viewscreen Display Size", we denote them by $A_1$ and $A_2$, respectively. For these categories one can define particular values, e.g., $A_1=\{$"4K UHD (2160p)", "FHD (1080p)", "HD (720p)", "SD (480p)"$\}$ and $A_2=\{$"UNDER 2 INCHES", "2 TO 2.9 INCHES", "3 TO 3.9 INCHES", "4 TO 4.9 INCHES" "5 TO 6.9 INCHES", "OVER 7 INCHES"$\}$.

For each category $G^*$, a concept lattice $\mathcal{L}_G*$ is built where each concept is a subset of similar objects from $G^*$ that share the same attributes. It should be noted that to build a concept lattice an extended space of attributes may be utilized. For ordinal variables interval-scaled attributes may be added to provide more flexible and powerful searching tools. For example, if for the set of attributes "Viewscreen Display Size" with values {"Under 2 Inches", "2 to 2.9 Inches", "3 to 3.9 Inches", "4 to 4.9 Inches", "5 to 6.9 Inches", "Over 7 Inches" } a user picked "2 to 2.9 Inches", "3 to 3.9 Inches" then the attributes will be translated into one "2 to 3.9 Inches" and all the cameras having the display of the size between 2 and 3.9 inches be chosen.

Concept lattices can support a wide variety of information retrieval techniques and systems that represent concisely the document and the query space which can be used as an index for automatic retrieval. In recent years, the Boolean information retrieval model has been considered as too limited for modem information retrieval requirements for search engines, agents, large datasets and complex document representations. Concept lattices can reuse the body of work of the formal concept analysis-based information retrieval techniques by providing support to complex document representations, such as numerical and heterogeneous indexes. The techniques discussed herein might be used in e-commerce, for real-estate agency services or any other field where users face a big amount of objects that form an ontology and is described by well-defined (structured) parameters/characteristics.

A formal context is a triple (G,M,I), where G and M are sets, called the set of objects and attributes, respectively. Let I be a relation $I \subseteq G \times M$ between objects and attributes, i.e. $(g,m) \in I$ if the object g has the attribute m. The derivation operator ($\cdot$) is defined for $A \subseteq G$ and $B \subseteq M$ as follows:

$$A'=\{m \in M | \forall g \in A: gIm\}$$

$$B'=\{g \in G | \forall m \in B: gIm\}$$

A' is the set of attributes common to all objects of A and B' is the set of objects sharing all attributes of B. The double application of ($\cdot$) is a closure operator i.e. ($\cdot$)" is extensive, idempotent and monotone. Sets (A)" and (B)" are referred to as closed. A formal concept is a pair (A,B), where $A \subseteq G$, $B \subseteq M$ and A'=B, B'=A. A and B are called the formal extent and the formal intent, respectively.

Pattern Structures are a generalization of formal contexts, where objects are described by more complex structures, rather than a binary data. A pattern structure can defined as a triple $(G,(D,\pi),\delta)$, where G is a set of objects, $(D,\pi)$ is a complete meet-semi-lattice of descriptions and $\delta: G \to D$ is a mapping of an object into a description. The connections between set of objects and their descriptions are defined as follows:

$$A':=\Pi_{g \in A} \delta S(g) \text{ for } A \subseteq G$$

$$d':=\{g \in G | d \subseteq \delta(g)\} \text{ for } d \in D$$

A pair (A,d) for which A' d and d'=A is and is called a pattern concept. A projection $\psi$ is a kernel operator, i.e. it is monotone $(x \subseteq y \Rightarrow \psi(x) \subseteq \psi(y))$, contractive $(\psi(x) \subseteq x)$, and idempotent $(\psi(\psi(x))=\psi(x))$. The mapping $\psi: D \to D$ is used to replace $(G,(D,\pi),\delta)$ by $(G,(D_\psi, \pi_\psi), \omega \circ \delta)$, where $D_\psi=\{d \in D | \exists d' \in D: \psi(d')=d\}$.

In our case, <an original paragraph of text and parse thickets constructed from this paragraph> correspond to <an object and its description as a pattern concepts> respectively. To improve efficiency and decrease time complexity, projection may be used instead of a parse thicket. Projection on a parse thicket is defined as a set of its maximal sub-trees and the intersection operator takes the form of the pairwise intersection of elements within noun and verb phrase groups.

In some embodiments, the autonomous agent application 108 of FIG. 1 can utilize the concept lattice 400 for dialog management. By way of example, the autonomous agent application 108 can implement an interactive search in which the agent clarifies user needs in the course of navigation. During the interaction, the agent is sending the refined queries to a search engine. The received snippets, i.e., short descriptions of the found objects, are grouped in clusters of similar snippets wherein the shared description of a cluster (its centroid) represents a specified query. Under specified query we mean a description of this query with the information for drilling in. Among computed specified queries, the user chooses a relevant one, in accordance with his current interest, that is used as a new refined query. The specification (updating the set of constraints) for the queries continues until the user does not find any more appropriate specifications or a snippet that corresponds exactly to the information she searched for is found. The similarity of snippets is defined not only by its syntactic similarity, but also by the relevance weights that are received from the web search engine.

In an example, the autonomous agent application 108 accesses a list of digital cameras (objects) (e.g., camera's A-K of FIG. 2). The attributes and their values (objects' attributes) are as follows: {Avg. Customer Review: 5, 4, 3, 2, 1, Viewscreen Display Size: Under 2 Inches, 2 to 2.9 Inches, 3 to 3.9 Inches, 4 to 4.9 Inches, 5 to 6.9 Inches, Over 7 Inches, Price: Under 25,25 to 50,50 to 100,100 to 200,200 and Above, Camera Viewfinder Type: LCD, Optical, Both, Video Capture Resolution: 4K UHD (2160p), FHD (1080p), HD (720p), SD (480p)}

User device 106 of FIG. 1 initiates a query 'Find cameras like Camera E but with 7 inch display'. The concept lattice 400 can be traversed from any node associated with Camera E (e.g., node 406 and any suitable number of attribute nodes connected directly or indirectly to node 406) to identify cameras with attributes like Camera E, but having 7 inch display instead of 6 inch. For example, the concept lattice 400 can be used to identify Camera C (e.g., corresponding to node 407) and Camera I(corresponding to node 408), both having the same average customer review and 7-inch view screens as Camera E, as well as Camera B and Camera K both having an FHS resolution. A response may be sent to the user indicating the existence of:

1) Camera I with 7 inch with SD resolution and an optical viewfinder
2) Camera C with 7 inch and UHD resolution and
3) Camera B and Camera K having FHD resolution.

Therefore, each option has a certain combination of objects and properties induced by the original object and the desired attribute. An initial query can mention a single object or a list of attributes. If the user selects option 2, the node corresponding to Camera C can be selected and the process may be repeated. The user can select a particular object each time, or give up on the current search session and starts over.

As another example, a user can formulate a query containing object name(s), attribute name(s), and/or object descriptions. As a result of running a keyword query, a set of attributes and objects may be obtained $(O_q, A_q)$ where $O_q$ is a set of objects satisfying this query, and $A_q$ is a set of attributes satisfying this query. From this pair, an initial lattice node $(O_0, A_0)$ (e.g., node 404) which is the closest pair to $(O_q, A_q)$ in a sense of having a minimal number of added/removed elements of summed object and attributed to derive $(O_0, A_0)$ from $(O_q, A_q)$. Once $(O_0, A_0)$ is identified, the lattice node may be fixed and the autonomous agent application 108 may enumerate and suitable number of $O_q$ and/or $A_q$ to the user. Then at each iteration i the user is expected to update the query, abruptly change interest, focus on the selected attribute or product, add/remove attributes, or find a similar object.

By way of example, an update can reduce the set of object of interest $O_i \Rightarrow O_{i+1}$. This can be accomplished via submitting the utterance 'remove/I am not interested/avoid objects/products'–$\Delta O_i$ of any suitable similar utterance. The result may include moving upward in the concept lattice 400 as it would result in fewer objects and more attributes. As another example, the user could extend the set of object of interest $O_i \Rightarrow O_{i+1}$. That can be requested via the utterance 'add/I am interested/extend objects/products/items'–$\Delta O_i$. The resultant action may include moving downward in the concept lattice 400 as it would result in more objects and less attributes. As yet another example, the user could submit another query to reduce the set of attributes of interest $A_i \Rightarrow A_{i+1}$. That can be requested via the utterance 'remove/I am not interested/avoid attributes/attributes/properties'–$\Delta A_i$. The resultant action may include moving downward in the concept lattice 400 as it would result in more objects and less attributes. In still one more example, the user could submit another query to extend the set of object of interest $A_i \Rightarrow A_{i+1}$. That can be requested via the utterance 'add/I am interested/extend objects/products/items'–$\Delta A_i$. The resultant action may include moving upward in the concept lattice 400 as it would result in fewer objects and more attributes.

In some embodiments, the user may indicate an abrupt change in interest. For example the user could proceed to focus on a new set $O_{i+1}$. That can be requested via the utterance 'switch to' $O_{i+1}$. As another example, the user could proceed to focus on a new set of attributes. That can be requested via the utterance 'switch' to $A_{i+1}$. Still further, the user could run a new query entirely. Each of these examples would cause a long-distance jump to a new area on the concept lattice 400. In some examples, if the new query related to objects of a different category, the new query could cause a jump to an entirely different concept lattice.

In some embodiments, the user may focus on a selected attribute or product $O_q$, $A_q$ with an utterance such as 'tell me more about/lets focus on product $O_{qk}$ (product x) or attribute/attribute $O_{qy}$ (attribute y). Using such an utterance may cause a long-distance jump up on the concept lattice 400 to the second row from the top for the selected attribute and to the second row from the bottom for the selected object.

In some embodiments, the user may add and/or remove attributes using an utterance such as 'make it without/get rid of' $A_{qx}$. This can cause a short jump in the concept lattice 400 similar to updating the query.

In some embodiments, the user may attempt to find similar products to $O_{ix}$ using the utterance is 'find/show/give me/take me to similar products for $O_{ix}$' (or a similar utterance). This operation retains the current set $A_i$ but switch to new objects $O_i^*$ which does not include $O_{ix}$. This can produce a horizontal shift operation on the concept lattice 400 to another node in the same level.

In some embodiments, the user may attempt to find similar objects with attribute to $A_{ix}$ using the utterance 'find/show/give me/take me to similar products with attribute $A_{ix}$' (or a similar utterance). This operation may find similar products to $O_i+A_i-A_{ix}$ which satisfy $A_{ix}$ and returns to the user multiple lattice nodes in the vicinity of the node $(O_i, A_i)$.

Figure 5:
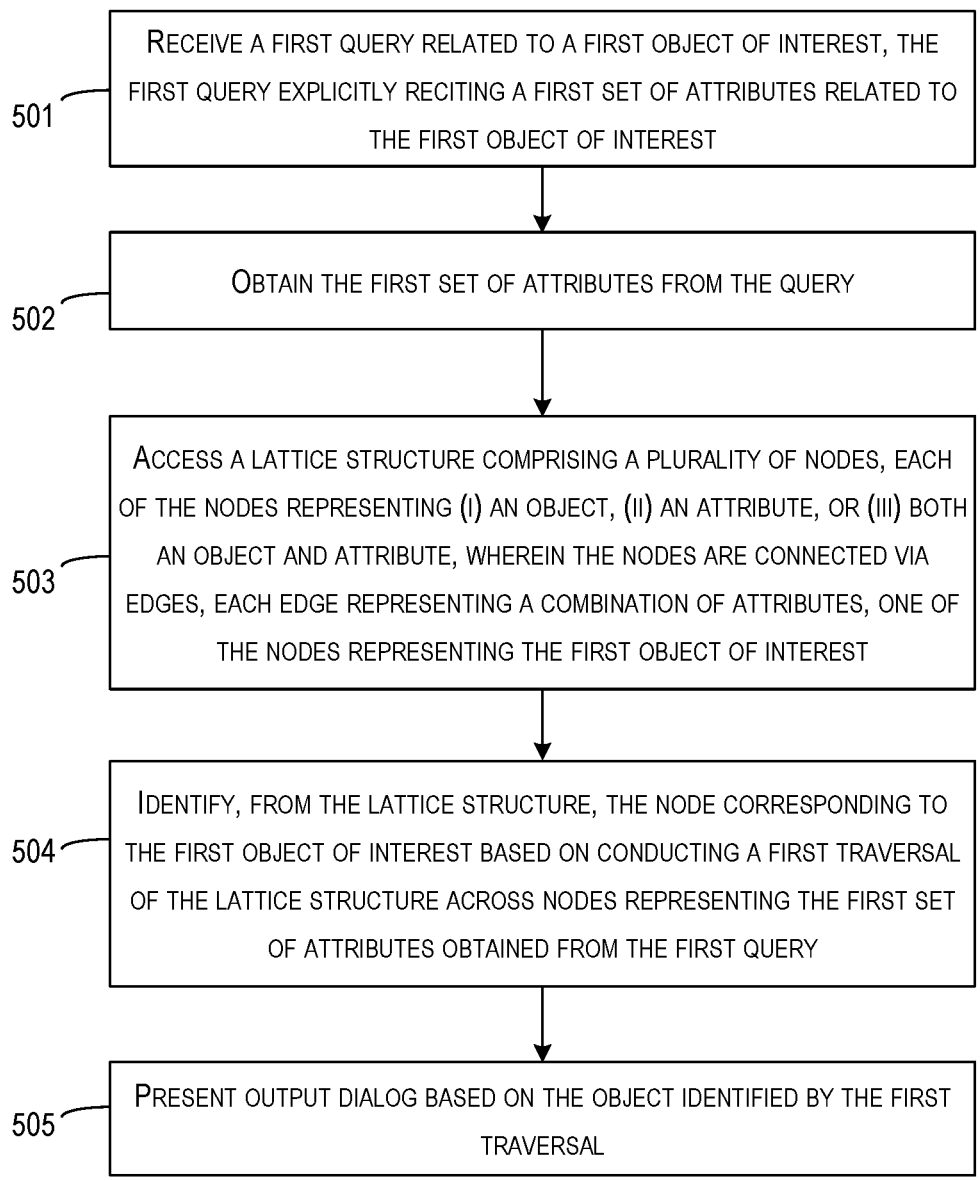
FIG. 5 illustrates an exemplary method for using a concept lattice to manage a dialogue, in accordance with at least one embodiment.

FIG. 5 illustrates an exemplary method 500 for using a concept lattice to manage a dialogue, in accordance with at least one embodiment. Method 500 can be implemented by autonomous agent application 108 of FIG. 1. Method 500 describes using the lattice structure (e.g., the concept lattice 400 of FIG. 4) to navigate from attribute node to object node, but the reverse is also possible.

Method 500 may begin at block 501, a first query may be received (e.g., from the user device 106 of FIG. 1). In some embodiments, the first query explicitly reciting a first set of attributes related to a first object of interest (e.g., an object) but not explicitly reciting the first object.

At block 502, the first set of attributes may be obtained from the query. By way of example, the first query can be obtained and keywords may be obtained. These keywords can be utilized to identify particular attributes from the query (e.g., by comparing keywords to a list of known attributes such as "size," "price," "resolution," and the like).

At block 503, a lattice structure (e.g., concept lattice 400) comprising a plurality of nodes may be accessed (e.g., by the autonomous agent application 108 of FIG. 1). In some embodiments, each of the nodes represent (i) an object, (ii) an attribute, or (iii) both an object and attribute. In some embodiments, the nodes are connected via edges, each edge representing a combination of attributes. One of the nodes within the lattice structure represents the first object of interest. In some embodiments, more than one lattice structure may exist. Each of these lattice structures may be associated with a respective object category. Thus, in some embodiments, accessing the lattice structure may include selecting the lattice structure from a set of lattice structures based on identifying an object category for the first object of interest and/or the query. The keywords determined at 502 can be utilized to determine a category for the query. At the same time, or as another operation, the first set of attributes may be obtained from the query.

At block 504, the node corresponding to the first object of interest may be identified within the lattice structure. In some embodiments, this node may be identified based on conducting a first traversal of the lattice structure across nodes representing the first set of attributes obtained from the first query. By way of example, a node associated with one attribute may be found and edges connecting that node to other nodes associated with other attributes of the first set of attributes may be traversed until a node corresponding to an object (e.g., the node corresponding to the object of interest is found).

At block 504, output dialog may be presented by the autonomous agent application 108 based on the object identified by the first traversal. Some example dialog is provided in the above examples discussed in connection with FIG. 4. This type of traversal can be performed any suitable number of times corresponding to any suitable number of queries received from the user. In some embodiments, depending on the query, a subsequent traversal may begin anew or the subsequent traversal can begin at a node previously selected based on the previous query.

Figure 6:
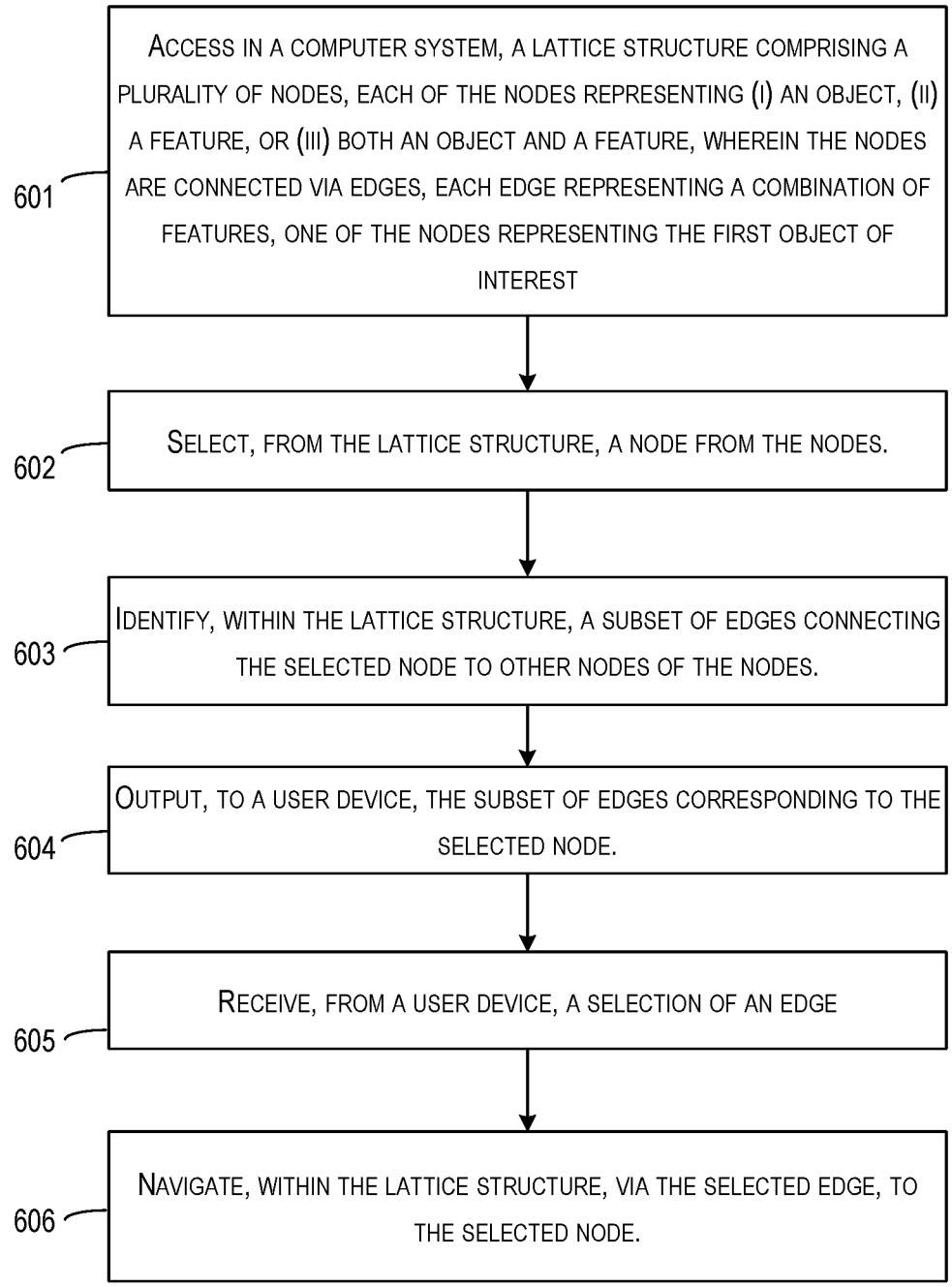
FIG. 6 illustrates another exemplary method for using a concept lattice to manage a dialogue, in accordance with at least one embodiment.

FIG. 6 illustrates an exemplary method 600 for using a concept lattice to manage a dialogue, in accordance with at least one embodiment. Method 600 can be implemented by autonomous agent application 108 of FIG. 1. Method 600 describes using the lattice structure (e.g., the concept lattice 400 of FIG. 4) to navigate from attribute node to object node, but the reverse is also possible.

At block 601, a lattice structure that comprises a plurality of nodes is accessed (e.g., concept lattice 400). Each of the nodes represents (i) an object, (ii) an attribute, or (iii) both an object and an attribute. Referring back to concept lattice 400 of FIG. 4, the nodes (e.g., attribute nodes representing attributes and/or object nodes representing objects) are connected via edges. For example, node 401 is connected by an edge to node 405. Similarly, node 405 is connected via an edge to node 404. Node 402 is connected to node 401 via an edge. Finally, node 403 is connected to node 402 via an edge. Each edge represents a combination of the attributes of the connected nodes.

In some cases, autonomous agent application 108 can create the concept lattice 400. For example, autonomous agent application 108 can access a set of formalized parameters (e.g., table 200) such as attributes and objects and create the concept lattice 400 therefrom using any suitable graphing techniques.

At block 602, method 600 involves selecting, from the lattice structure, a node from the nodes. The selection can originate from a user device. For example, referring back to FIG. 4, user device 106 of FIG. 1 can select node 401 ("flash=1") to indicate that a flash is desired. Within concept lattice 400, the attributes can have binary values. For example, node 402 represents an attribute (e.g., "VF LCD") where the "(1)" indicates a binary value of "true" indicating a presence of the attribute, or a range of permitted values, according to a predefined data structure.

At block 603, method 600 involves identifying, within the concept lattice 400, a subset of edges connecting the selected node to other nodes of the nodes. Continuing the example, the edges connect node 401 ("flash (1)") to node 404 ("ACR 5 (1)") and node 405 ("price 100-200 (1)), and, by way of other intermediate nodes, nodes representing objects with the specific attributes, such as node 403 or "Product=Camera G."

At block 604, method 600 involves outputting, to the user device (e.g., via the user interface 300 and/or via textual dialog responses), the subset of edges corresponding to the selected node. The subset of edges represent attributes that can be added or subtracted from the object represented by the selected node. Autonomous agent application 108 can output the different edges to user device 106. The edges represent transitions to different attributes and/or objects.

At block 605, method 600 involves receiving, from a user device, a selection of an edge. Continuing the example, user device 106 selects node 402, which, in effect, selects the connecting edge between the two.

At block 606, method 600 involves navigating, within the lattice structure, via the selected edge, to the selected node (e.g., node 402). As described, autonomous agent application 108 uses the lattice structure to manage a dialogue session.

FIG. 7 depicts an algorithm 700 for a lattice walk, in accordance with at least one embodiment. In some embodiments, the algorithm may be performed by the autonomous agent application 108 of FIG. 1. The input to the algorithm 700 is a query $8(q)$ in natural language. The output of the algorithm is a set of subsets of snippets $\{\mathcal{A}^* | \mathcal{A}^* \subseteq \mathcal{A}\}$.

As an initial matter, a user sends a query q in NL. From the user request a subject, i.e., the name k of the category of objects, i.e., $k \in K(G^*)$, and its properties $P_q \subseteq \mathcal{A}$ are obtained (e.g., extracted). Once a particular category $G^* \in \mathcal{O}$ in the thesaurus is found, the dialogue manager assesses the lattice $\mathcal{L}_G^*$ where the most general concept having the $P_q$ (or its extended version $P_q^{scaled}$) is chosen. Now navigation through the lattice is started. The choice of nodes in the lattice is driven by the user responses. Once a particular class of objects has been identified (such as $G^* \in \mathcal{O}$), the corresponding lattice $\mathcal{L}_G^*$ is chosen to support further query refinement. The algorithm 700 provides sequential questioning of the user, where a new user response is used to jump to the most relevant node in a lattice (i.e., a subgroup of objects) and propose the best refinement for the chosen node.

At line 1, the keyword k for the searched object and its properties $P_q$ are obtained from the query q. At line 2, a category (G*) is chosen in the ontology $\mathcal{O}$ based on the keyword k, and a corresponding lattice $\mathcal{L}_G$* is used for query refinement. At line 3, the biggest group of objects having all properties $P_q$ (e.g., (A,B)) are determined from the lattice $\mathcal{L}_G$*. At line 4, $GS_{ranked}$ is set to the resultant group of objects from line 3.

Further, in an interactive manner, the better concept with respect to Δ-measure is taken from $GS_{ranked}$ (line 7). The corresponding set of objects $A_r$ are taken as the relevant one. The lower neighbors of $\mathcal{LN}(A_r,B_r)$, i.e., the specified groups of objects, contain new categories of attributes $\mathcal{M}$* that can be relevant for user. At line 9, the categories of attributes are obtained from $\mathcal{LN}(A_r,B_r)$ and suggested to user at line 10. If the user chooses particular categories he wants to specify, i.e., $\mathcal{LN}*_{spec}/=0$ then the concrete values of these categories are suggested to the user. Once the values for the selected categories have been chosen, the largest groups of objects GC containing the specified attributes are selected from the lattice $\mathcal{L}_G$*. These objects are ranked by Δ-measure, the top-one is chosen and a new query refinement is launched.

There are two cases where the user might fail to find a possible specification. If the user considers all the suggested categories of refinement irrelevant (at line 11), then the objects $A_r$ from the current concepts are returned to the user. If the user has chosen categories but found all the suggested properties irrelevant, the refinement is re-launched with the next concept in $GS_{ranked}$.

As mentioned above, once the specified information of the user's request is received a new refined query is formulated using the node in the lattice with the maximal δ-measure. Putting it differently, the node (A,B), with the maximal δ-measure is presumed to be the best. The concepts with high δ-measures are considered as the most stable, i.e., the removal of several objects from A does not cause the changing of their description. Thus, ranking of concepts based on δ-measure gives preferences to more "stable" specification of the query.

Figure 8:
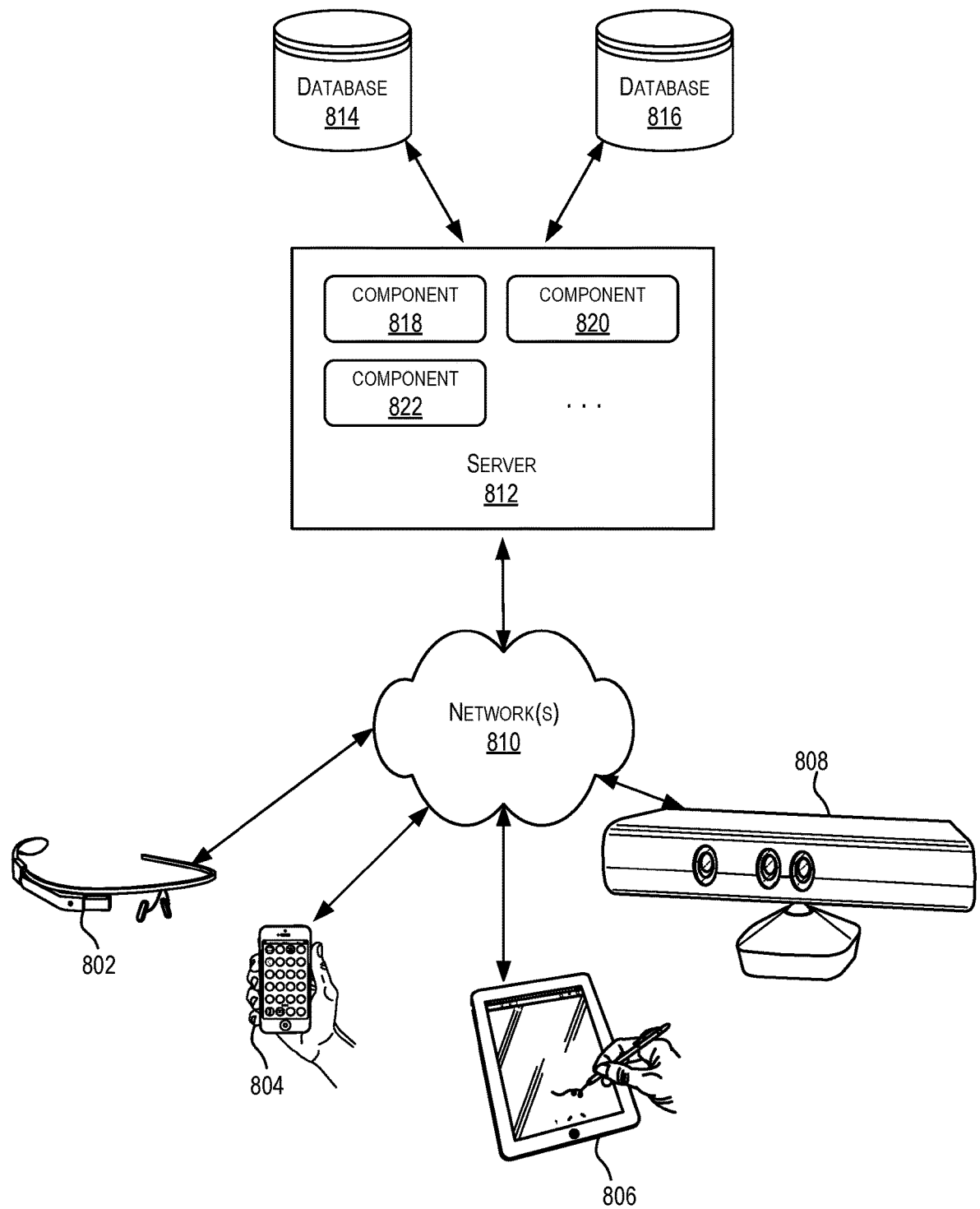
FIG. 8 depicts a simplified diagram of a distributed system for implementing one of the aspects.

FIG. 8 depicts a simplified diagram of a distributed system 800 for implementing one of the aspects. In the illustrated aspect, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network(s) 810.

In various aspects, server 812 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other aspects, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The aspect shown in the figure is thus one example of a distributed system for implementing an aspect system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various aspects, server 812 may be adapted to run one or more services or software applications described in the foregoing disclosure. For example, server 812 may correspond to a server for performing processing described above in accordance with an aspect of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of aspects, databases 814 and 816 may reside in a storage-area network (SAN). Similarly, any necessary files for performing the functions attributed to server 812 may be stored locally on server 812 and/or remotely, as appropriate. In one set of aspects, databases 814 and 816 may include relational databases, such as databases provided by Oracle, that are adapted to store, update, and retrieve data in response to SQL-formatted commands.

Figure 9:
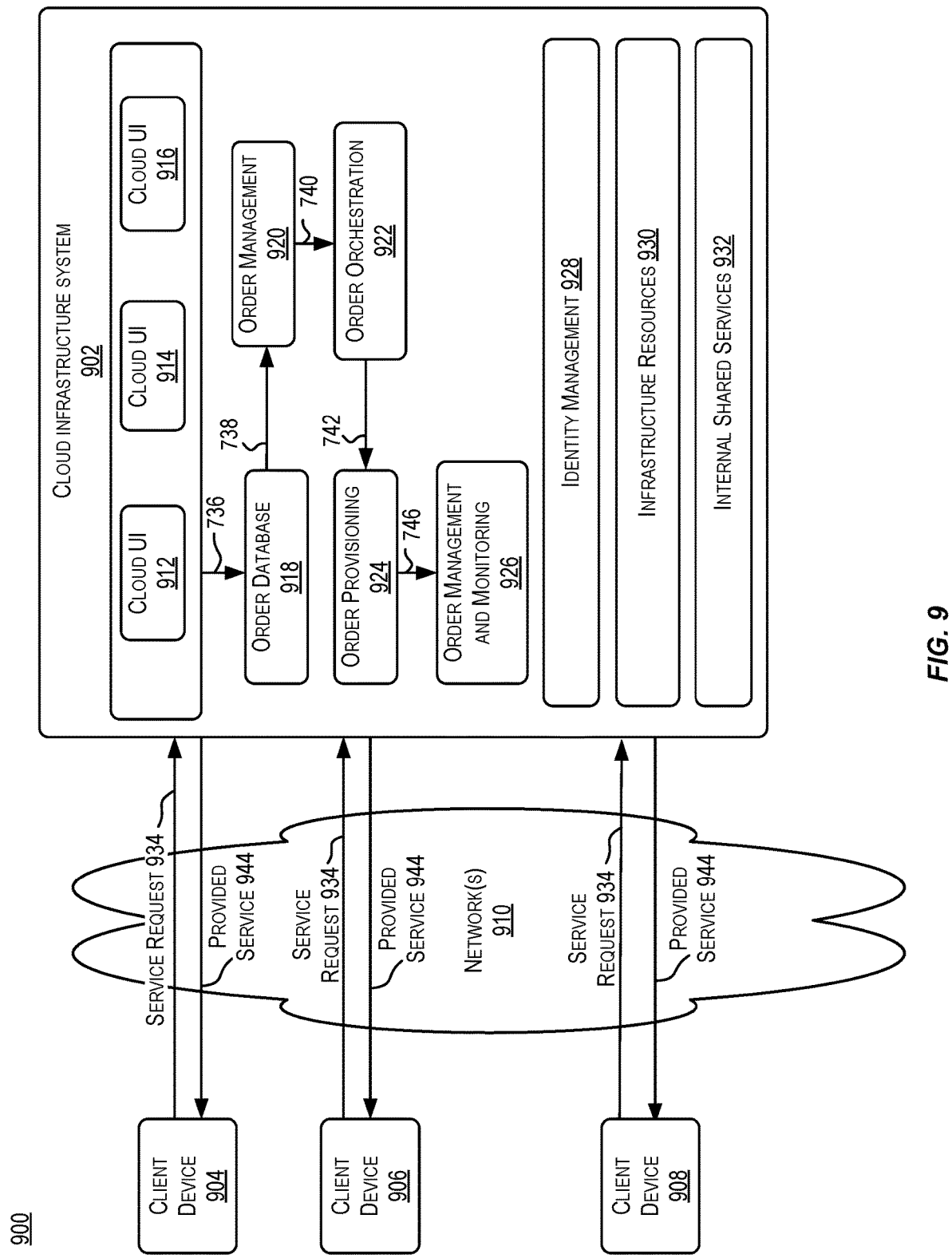
FIG. 9 is a simplified block diagram of components of a system environment by which services provided by the components of an aspect system may be offered as cloud services in accordance with an aspect.

FIG. 9 is a simplified block diagram of one or more components of a system environment 900 (e.g., a cloud infrastructure system) by which services provided by one or more components of an aspect system may be offered as cloud services, in accordance with an aspect of the present disclosure. In the illustrated aspect, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the aspect shown in the figure is only one example of a cloud infrastructure system that may incorporate an aspect of the invention. In some other aspects, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between client computing devices 904, 906, and 908 and cloud infrastructure system 902. Each network may be any type of network familiar to those skilled in the art that can support data communications using any of a variety of commercially-available protocols, including those described above for network(s) 910.

Cloud infrastructure system 902 may comprise one or more computers and/or servers that may include those described above for server 812 of FIG. 8.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some aspects, the services provided by cloud infrastructure system 902 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some aspects, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 902 may also include infrastructure resources 930 for providing the resources used to provide various services to customers of the cloud infrastructure system. In one aspect, infrastructure resources 930 may include pre-integrated and optimized combinations of hardware, such as servers, storage, and networking resources to execute the services provided by the PaaS platform and the SaaS platform.

In some aspects, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 902, and the like.

In one aspect, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client computing devices 904, 906 or 908, may interact with cloud infrastructure system 902 by requesting one or more services provided by cloud infrastructure system 902 and placing an order for a subscription for one or more services offered by cloud infrastructure system 902. In certain aspects, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 in which the customer intends to subscribe.

After an order has been placed by the customer, the order information is received via the cloud UIs, 912, 914 and/or 916.

At operation 936, the order is stored in order database 918. Order database 918 can be one of several databases operated by cloud infrastructure system 902 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain aspects, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by system environment 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client computing devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain aspects, system environment 900 may include an identity management module 928. Identity management module 928 may be configured to provide identity services, such as access management and authorization services in system environment 900. In some aspects, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

Figure 10:
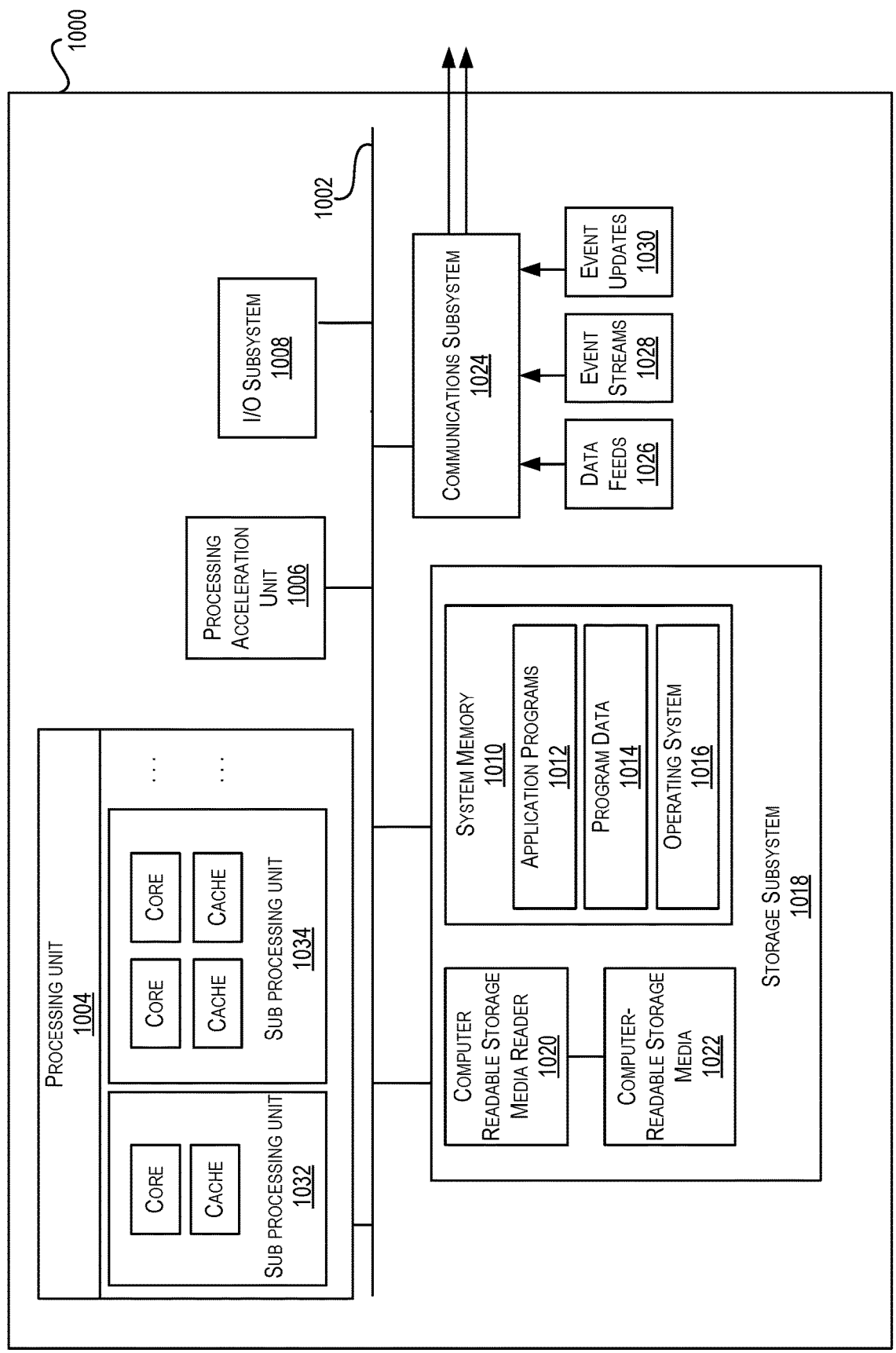
FIG. 10 illustrates an exemplary computer system, in which various aspects may be implemented.

FIG. 10 illustrates an exemplary computer system 1000, in which various aspects may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative aspects of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain aspects, processing unit 1004 may be implemented as one or more independent processing units 1032 and/or 1034 with single or multicore processors included in each processing unit. In other aspects, processing unit 1004 may also be implemented as a quad-core processing unit formed by integrating two dual-core processors into a single chip.

In various aspects, processing unit 1004 can execute a variety of programs in response to program code and can maintain multiple concurrently executing programs or processes. At any given time, some or all of the program code to be executed can be resident in processing unit 1004 and/or in storage subsystem 1018. Through suitable programming, processing unit 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some aspects. Software (programs, code modules, instructions) that when executed by a processor provide the functionality described above, may be stored in storage subsystem 1018. These software modules or instructions may be executed by processing unit 1004. Storage subsystem 1018 may also provide a repository for storing data used in accordance with the present invention.

Storage subsystem 1018 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1000.

Byway of example, computer-readable storage media 1022 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some aspects, communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1024 can provide wired network connectivity (e.g., Ethernet) in addition to or instead of a wireless interface.

In some aspects, communications subsystem 1024 may also receive input communication in the form of structured and/or unstructured data feeds 1026, event streams 1028, event updates 1030, and the like on behalf of one or more users who may use computer system 1000.

Byway of example, communications subsystem 1024 may be configured to receive unstructured data feeds 1026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method comprising:
  receiving from a user device a first query comprising a first set of attributes;
  obtaining the first set of attributes from the first query;
  selecting a product category from a plurality of product categories based at least in part on the first query;
  accessing, in a computer system, a lattice structure including a plurality of paths, the lattice structure associated with the product category and comprising a plurality of nodes and a plurality of edges, the lattice structure representing a plurality of attribute combinations corresponding to a plurality of products associated with the product category, each of the nodes representing a product or an attribute, wherein the nodes are connected via edges, each path of the plurality of paths formed from a top node through one or more intermediate nodes, to a respective node corresponding to a respective product representing a respective combination of attributes associated with the respective product;

presenting the lattice structure via a user interface;

identifying, from the lattice structure, a first node representing a first product based on conducting a first traversal of the lattice structure corresponding to a first path of nodes, the first traversal being conducted based on the first set of attributes obtained from the first query, the first traversal starting at the top node, through a first set of intermediate nodes, to the first node representing the first product, the first path of nodes representing the first traversal and a combination of the first set of attributes obtained from the first query;

presenting, via the lattice structure presented at the user interface, output that visually distinguishes, from other paths of the lattice structure, the first path of nodes representing the first traversal conducted based on the first set of attributes obtained from the first query;

identifying, from user input, a variation of a particular attribute from the first set of attributes obtained from the first query and corresponding to the respective combination of attributes associated with the first product;

starting from the first node representing the first product, performing an upward traversal within the lattice structure from the first node to one of the intermediate nodes based at least in part on the variation of the particular attribute identified from the user input;

identifying a second node connected to the intermediate node and corresponding to a second product that is similar to the first product; and providing, via the lattice structure presented at the user interface, second output that visually distinguishes a second path of nodes from the top node, through a second set of intermediate nodes comprising the intermediate node, to the second node representing the second product that is similar to the first product.

2. The method of claim 1, further comprising:
receiving, from the user device, a third selection of a third node of a third set of nodes; and
presenting, by the computer system via the lattice structure presented at the user interface, additional output that visually distinguishes the third set of nodes of the lattice structure from other nodes of the plurality of nodes of the lattice structure, the third set of nodes representing a third combination of attributes of a third product.

3. The method of claim 1, further comprising:
receiving a second query;
obtaining a second set of attributes from the second query;
identifying a third product from the lattice structure, the third product being identified based on conducting a second traversal of the lattice structure corresponding to a third path of nodes representing the second set of attributes obtained from the second query, the second traversal being conducted starting at the top node, through a third set of intermediate nodes, to a third node representing the third product; and
presenting third output based on the second traversal of the lattice structure, the third output visually distinguishing the third path of nodes of the lattice structure from other nodes of the plurality of nodes of the lattice structure, the third path of nodes representing the second traversal and a second combination of the second set of attributes of the third product.

4. The method of claim 1, wherein conducting the first traversal of the lattice structure comprises identifying corresponding nodes and connected edges of the lattice structure that correspond to at least one of the first set of attributes.

5. The method of claim 1, wherein an autonomous agent application is configured to generate output dialog based on the first node identified from the lattice structure.

6. The method of claim 1, further comprising:
obtaining a table corresponding to the plurality of products associated with the product category, the table indicating a corresponding set of attributes for each of the plurality of products; and
generating the lattice structure for the product category based on the table.

7. The method of claim 1, further comprising:
obtaining a plurality of lattice structures each of the plurality of lattice structures corresponding to a respective product category, each lattice structure of the plurality of lattice structures identifying a corresponding plurality of products having various combinations of a corresponding plurality of attributes; and
selecting the lattice structure from the plurality of lattice structures based on identifying that the first query relates to the product category associated with the lattice structure.

8. The method of claim 1, wherein the first query does not explicitly recite the first product.

9. A system comprising:
a computer-readable medium storing non-transitory computer-executable program instructions; and
a processing device communicatively coupled to the computer-readable medium for executing the non-transitory computer-executable program instructions, wherein executing the non-transitory computer-executable program instructions configures the processing device to perform operations comprising:
receiving, from a user device, a first query comprising a first set of attributes;
obtaining the first set of attributes from the first query;
selecting a product category from a plurality of product categories based at least in part on the first query;
accessing a lattice structure including a plurality of paths, the lattice structure associated with the product category and comprising a plurality of nodes and a plurality of edges, the lattice structure representing a plurality of attribute combinations corresponding to a plurality of products associated with the product category, each of the nodes representing a product or an attribute, wherein the nodes are connected via edges, each path of the plurality of paths formed from a top node through one or more intermediate nodes, to a respective node corresponding to a respective product representing a respective combination of attributes associated with the respective product;
presenting the lattice structure via a user interface;
identifying, from the lattice structure, a first node representing a first product based on conducting a first traversal of the lattice structure corresponding to a first path of nodes, the first traversal being conducted based on the first set of attributes obtained from the first query, the first traversal starting at the top node, through a first set of intermediate nodes, to the first node representing the first product, the first path of nodes representing the first traversal and a combination of the first set of attributes obtained from the first query;

presenting, via the lattice structure presented at the user interface, output that visually distinguishes, from other paths of the lattice structure, the first path of nodes representing the first traversal conducted based on the first set of attributes obtained from the first query;

identifying, from user input, a variation of a particular attribute from the first set of attributes obtained from the first query and corresponding to the respective combination of attributes associated with the first product;

starting from the first node representing the first product, performing an upward traversal within the lattice structure from the first node to one of the intermediate nodes based at least in part on the variation of the particular attribute identified from the user input;

identifying a second node connected to the intermediate node and corresponding to a second product that is similar to the first product; and providing, via the lattice structure presented at the user interface, second output that visually distinguishes a second path of nodes from the top node, through a second set of intermediate nodes comprising the intermediate node, to the second node representing the second product that is similar to the first product.

10. The system of claim 9, wherein the operations further comprise:

receiving, from the user device, a third selection of a third node of a third set of nodes; and presenting, by the system via the lattice structure presented at the user interface, additional output that visually distinguishes the third set of nodes of the lattice structure from other nodes of the plurality of nodes of the lattice structure, the third set of nodes representing a third combination of attributes of a third product.

11. The system of claim 9, wherein the operations further comprise:

receiving a second query;

obtaining a second set of attributes from the second query;

identifying a third product from the lattice structure, the third product being identified based on conducting a second traversal of the lattice structure corresponding to a third path of nodes representing the second set of attributes obtained from the second query, the second traversal being conducted starting at the top node, through a third set of intermediate nodes, to a third node representing the third product; and presenting third output based on the second traversal of the lattice structure, the third output visually distinguishing the third path of nodes of the lattice structure from other nodes of the plurality of nodes of the lattice structure, the third path of nodes representing the second traversal and a second combination of the second set of attributes of the third product.

12. The system of claim 9, wherein conducting the first traversal of the lattice structure comprises identifying corresponding nodes and connected edges of the lattice structure that correspond to at least one of the first set of attributes.

13. The system of claim 9, wherein an autonomous agent application is configured to generate output dialog based on the first node identified from the lattice structure.

14. The system of claim 9, wherein the operations further comprise:

obtaining a table corresponding to the plurality of products associated with the product category, the table indicating a corresponding set of attributes for each of the plurality of products; and generating the lattice structure for the product category based on the table.

15. The system of claim 9, wherein the operations further comprise:

obtaining a plurality of lattice structures each of the plurality of lattice structures corresponding to a respective product category, each lattice structure of the plurality of lattice structures identifying a corresponding plurality of products having various combinations of a corresponding plurality of attributes; and selecting the lattice structure from the plurality of lattice structures based on identifying that the first query relates to the product category associated with the lattice structure.

16. The system of claim 9, wherein the first query does not explicitly recite the first product.

17. A non-transitory computer-readable medium storing computer-executable program instructions that, when executed by a processing device, cause the processing device to perform operations comprising:

receiving, from a user device, a first query comprising a first set of attributes;

obtaining the first set of attributes from the first query;

selecting a product category from a plurality of product categories based at least in part on the first query;

accessing a a lattice structure including a plurality of paths, the lattice structure associated with the product category and comprising a plurality of nodes and a plurality of edges, the lattice structure representing a plurality of attribute combinations corresponding to a plurality of products associated with the product category, each of the nodes representing a product or an attribute, wherein the nodes are connected via edges, each path of the plurality of paths formed from a top node through one or more intermediate nodes, to a respective node corresponding to a respective product representing a respective combination of attributes associated with the respective product;

presenting the lattice structure via a user interface;

identifying, from the lattice structure, a first node representing a first product based on conducting a first traversal of the lattice structure corresponding to a first path of nodes, the first traversal being conducted based on the first set of attributes obtained from the first query, the first traversal starting at the top node, through a first set of intermediate nodes, to the first node representing the first product, the first path of nodes representing the first traversal and a combination of the first set of attributes obtained from the first query;

presenting, via the lattice structure presented at the user interface, output that visually distinguishes, from other paths of the lattice structure, the first path of nodes representing the first traversal conducted based on the first set of attributes obtained from the first query;

identifying, from user input, a variation of a particular attribute from the first set of attributes obtained from the first query and corresponding to the respective combination of attributes associated with the first product;

starting from the first node representing the first product, performing an upward traversal within the lattice structure from the first node to one of the intermediate nodes based at least in part on the variation of the particular attribute identified from the user input;

identifying a second node connected to the intermediate node and corresponding to a second product that is similar to the first product; and providing, via the lattice structure presented at the user interface, second output that visually distinguishes a second path of nodes from the top node, through a second set of intermediate nodes comprising the intermediate node, to the second node representing the second product that is similar to the first product.

18. The non-transitory computer-readable medium of claim 17, wherein conducting the first traversal of the lattice structure comprises identifying corresponding edges of the lattice structure that correspond to at least one of the first set of attributes.

19. The non-transitory computer-readable medium of claim 17, wherein an autonomous agent application is configured to generate output dialog based on the first node identified from the lattice structure.

20. The non-transitory computer-readable medium of claim 17, wherein the first query does not explicitly recite the first product.

21. The method of claim 1, further comprising:

presenting, via the user interface, a plurality of options for navigating within the lattice structure;

receiving additional user input selecting an option of the plurality of options, the option corresponding to a third product, the option being different from the plurality of nodes; and presenting, via the lattice structure presented at the user interface, third output that visually distinguishes a third set of nodes of the lattice structure from other nodes of the plurality of nodes, the third set of nodes representing attributes associated with the third product.

22. The method of claim 1, further comprising:

receiving additional user input indicating one or more products of the plurality of products; and removing one or more corresponding sets of nodes and edges from being presented within the lattice structure presented at the user interface, the one or more corresponding sets of nodes and edges being associated with the one or more products indicated in the additional user input.

* * * * *